US009980311B2

(12) United States Patent
Kitagawa et al.

(10) Patent No.: US 9,980,311 B2
(45) Date of Patent: May 22, 2018

(54) APPARATUS AND METHOD OF RESUMING WIRELESS COMMUNICATION VIA INTERTERMINAL COMMUNICATION BETWEEN WIRELESS COMMUNICATION TERMINALS

(71) Applicant: KDDI CORPORATION, Shinjuku-ku (JP)

(72) Inventors: Koichiro Kitagawa, Fujimino (JP); Yasuyuki Hatakawa, Fujimino (JP); Satoshi Konishi, Fujimino (JP)

(73) Assignee: KDDI Corporation, Tokyo (JP)

( * ) Notice: Subject to any disclaimer, the term of this patent is extended or adjusted under 35 U.S.C. 154(b) by 134 days.

(21) Appl. No.: 14/409,834

(22) PCT Filed: Jul. 4, 2013

(86) PCT No.: PCT/JP2013/068392
§ 371 (c)(1),
(2) Date: Dec. 19, 2014

(87) PCT Pub. No.: WO2014/007338
PCT Pub. Date: Jan. 9, 2014

(65) Prior Publication Data
US 2015/0208459 A1 Jul. 23, 2015

(30) Foreign Application Priority Data
Jul. 5, 2012 (JP) .................. 2012-151403

(51) Int. Cl.
*H04W 36/00* (2009.01)
*H04W 76/02* (2009.01)
*H04W 36/30* (2009.01)
*H04W 36/24* (2009.01)
*H04W 88/04* (2009.01)

(52) U.S. Cl.
CPC ......... *H04W 76/028* (2013.01); *H04W 36/24* (2013.01); *H04W 36/30* (2013.01); *H04W 88/04* (2013.01)

(58) Field of Classification Search
CPC . H04W 24/02; H04W 36/0094; H04W 36/30; H04W 40/02; H04W 40/246; H04W 56/00; H04W 76/027
(Continued)

(56) References Cited

U.S. PATENT DOCUMENTS

2001/0036810 A1  11/2001  Larsen
2010/0173626 A1   7/2010  Catovic et al.
(Continued)

FOREIGN PATENT DOCUMENTS

JP  2006-279187 A  10/2006
JP  2009-171409 A   7/2009
(Continued)

OTHER PUBLICATIONS

Partial Supplementary European Search Report for European Application No. 13813856.5, dated Feb. 25, 2016.
(Continued)

*Primary Examiner* — Joseph Arevalo
(74) *Attorney, Agent, or Firm* — Morgan, Lewis & Bockius LLP

(57) ABSTRACT

A wireless communication terminal includes a base station communication part which communicates with a base station; an interterminal communication part which communicates with another wireless communication part; a communication failure detector which detects a communication failure with a first connected base station serving as a base station connected thereto; and a communication resume processor which carries out an interterminal communication with another wireless communication terminal so as to
(Continued)

communicate with a second connected base station, connected to another wireless communication terminal, via another wireless communication terminal when a communication failure is detected with the first connected base station, thus carrying out a process of resuming a communication upon detecting the communication failure.

5 Claims, 9 Drawing Sheets

(58) Field of Classification Search
USPC .... 455/41.2, 436, 67.11, 509, 507; 370/329, 370/315, 252, 218
See application file for complete search history.

(56) References Cited

U.S. PATENT DOCUMENTS

| | | | |
|---|---|---|---|
| 2013/0288668 A1* | 10/2013 | Pragada | H04W 12/06 455/426.1 |
| 2014/0349694 A1* | 11/2014 | Raghothaman | H04W 36/00 455/509 |

FOREIGN PATENT DOCUMENTS

| | | |
|---|---|---|
| JP | 2011-066764 A | 3/2011 |
| JP | 2011-082655 A | 4/2011 |
| JP | 2011-172295 A | 9/2011 |
| WO | 2011/0149316 A2 | 12/2011 |

OTHER PUBLICATIONS

3GPP, TS 36.300, v9.0.0 (Jun. 2009), pp. 1-157.
3GPP, TS 36.331, v9.0.0 (Sep. 2009), pp. 1-213.
W. Xinzhou et al., "FlashLinQ: A synchronous distributed scheduler for peer-to-peer ad hoc networks", 2010 48th Annual Allerton Conference on Communication, Control, and Computing (Allerton), pp. 514-521, Sep. 29, 2010-Oct. 1, 2010.
3GPP, TS 36.423, v10.4.0 (Dec. 2011), pp. 1-132.
International Search Report dated Sep. 24, 2013 for International Application No. PCT/JP2013/068392.

* cited by examiner

APPARATUS AND METHOD OF RESUMING WIRELESS COMMUNICATION VIA INTERTERMINAL COMMUNICATION BETWEEN WIRELESS COMMUNICATION TERMINALS

TECHNICAL FIELD

The present invention relates to a wireless communication terminal, a base station, a wireless communication method, a communication method, a wireless communication program, a communication program, and a wireless communication system.

The present application claims priority on Japanese Patent Application No. 2012-151403 filed Jul. 5, 2012, the entire content of which is incorporated herein by reference.

BACKGROUND ART

The LTE (Long-Term Evolution) has been known as one standard of a wireless cellular system. A mechanism regarding a communication failure, occurring in wireless communication terminals (or terminals) in the LTE system, will be described below (see Non-Patent Literature Documents 1, 2).

The outline of procedures performed with wireless communication terminals upon detecting radio link failures (RLF: Radio Link Failure) will be described below.

FIG. 11 is an illustration showing an example of a procedure performed with a wireless communication terminal upon detecting a radio link failure in the LTE system. All the processes will be carried out in a wireless communication terminal.

When a wireless communication terminal undergoes a communication failure, it detects RLF at first (step S1001).

Upon detecting RLF, a wireless communication terminal starts a radio link reconfiguration procedure (RRC Reconfiguration Procedure). The wireless communication terminal restarts communication with a connected station upon normally completing the reconfiguration procedure.

When a wireless communication terminal fails to perform a reconfiguration procedure (step S1002), it starts a process to select a reconnected base station (Cell Reselection). When the wireless communication terminal is successfully connected to the originally connected station owing to the cell reselection, it may receive data from its intermediate part during transmission.

However, all the data retained in a base station during a transmission standby state will be lost when the reconnected base station of a wireless communication terminal differs from the original base station (i.e. when a wireless communication terminal selects another base station, other than the currently connected base station, as the reconnected base station). In this case, the wireless communication station should carry out data transmission/reception from the beginning, which in turn may cause a significant communication delay in the wireless communication terminal.

Additionally, a communication failure may occur when a wireless communication terminal fails to discover an appropriate base station as the reconnected base station.

As an example of a prior art, Patent Literature Document 1 discloses a wireless communication terminal which is able to continue an interterminal communication without the need of an operation of registering identification and key information in advance even when it moves outside of wireless communication range during communication.

CITATION LIST

Patent Literature Document

Patent Literature Document 1: Japanese Patent Application Publication No. 2009-171409

Non-Patent Literature Document

Non-Patent Literature Document 1: 3GPP, TS 36.300, v9.0.0, http://www.3gpp.org/.
Non-Patent Literature Document 2: 3GPP, TS 36.331, v9.0.0, http://www.3gpp.org/.
Non-Patent Literature Document 3: W. Xinzhou et al., "FlashLinQ: A synchronous distributed scheduler for peer-to-peer ad hoc networks", 2010 48th Annual Allerton Conference on Communication, Control, and Computing (Allerton), pp. 514-521, Sep. 29, 2010-Oct. 1, 2010
Non-Patent Literature Document 4: 3GPP, TS 36.423, v10.4, http://www.3gpp.org/.

SUMMARY OF INVENTION

Technical Problem

As described above, in the conventional wireless cellular system, when a wireless communication terminal in communication with a base station fails to communicate with the base station due to an unknown reason (i.e. when a wireless communication terminal fails to continue communication with a base station due to unknown reason), the data being transmitted from the base station will be lost due to a communication failure, thus causing a problem in which a significant delay may occur in receiving data with the wireless communication terminal.

The present invention is produced in consideration of the aforementioned circumstances. It is an object of the invention to provide a wireless communication terminal, a base station, a wireless communication method, a communication method, a wireless communication program, a communication program, and a wireless communication system, which may allow a wireless communication terminal, which is disconnected in communication with a base station, to efficiently restart communication.

Solution to Problem

To solve the above problem, the present invention is directed to a wireless communication terminal including a base station communication part which communicates with a base station; an interterminal communication part which carries out an interterminal communication with another wireless communication terminal; a communication failure detector which detects a communication failure with a first connected base station serving as a base station connected thereto; and a communication resume processor which carries out an interterminal communication with another wireless communication terminal so as to communicate with a second connected base station, connected to another wireless communication terminal, via another wireless communication terminal when the communication failure detector detects a communication failure with the first connected base station, thus carrying out a process of resuming a communication upon detecting the communication failure.

In the wireless communication terminal of the present invention, after the communication failure detector detects a communication failure with the first connected base station, the communication resume processor carries out the process of resuming a communication upon detecting the communication failure before selecting a reconnected base station or after selecting the reconnected base station.

In the wireless communication terminal of the present invention, the communication resume processor resumes a communication with the first connected base station via another wireless communication terminal when the second connected base station matches the first connected base station. Alternatively, the communication resume processor communicates with the second connected base station receiving data from the first connected base station via another wireless communication terminal when the second connected base station differs from the first connected base station.

In the wireless communication terminal of the present invention, it is preferable for the communication resume processor to include a self-identification notification part which notifies another wireless communication terminal of an identification used for the first connected base station.

In the wireless communication terminal of the present invention, it is preferable for the communication resume processor to include a terminal selector which selects as another wireless communication terminal a wireless communication terminal having the highest received signal quality among a plurality of wireless communication terminals enabling interterminal communications.

In the wireless communication terminal of the present invention, it is preferable for the communication resume processor to include a terminal selector which selects as another wireless communication terminal a wireless communication terminal connected to the first connected base station among a plurality of wireless communication terminals with the received signal quality equal to or above the predetermined threshold.

In another aspect of the present invention, a wireless communication terminal includes a base station communication part which communicates with a base station; an interterminal communication part which carries out an interterminal communication with another wireless communication terminal; and an other-identification notification part which notifies a first connected base station of an identification of another wireless communication terminal, which is notified by another wireless communication terminal via an interterminal communication, when a communication failure is detected with the first connected base station serving as a base station connected thereto.

The present invention is directed to a base station including a wireless communication part which communicates with a first wireless communication terminal; a line communication part which communicates with another base station; a storage unit which stores data to be transmitted to the first wireless communication terminal; and a data transmission part which transmits the data to be transmitted to the first wireless communication terminal to another base station, connected to a second wireless communication terminal carrying out an interterminal communication with the first wireless communication terminal, when a communication failure is detected with the first wireless communication terminal.

In the base station of the present invention, the data transmission part transmits data when the amount of data is less than the predetermined threshold.

In the base station of the present invention, the data transmission part transmits data when a ratio of the amount of data destined to the first wireless communication terminal to the entire amount of transmitting data is less than the predetermined threshold.

In the base station of the present invention, the data transmission part compares a first estimated time required to transmit residual data destined to the first wireless communication terminal to another base station with a second estimated time required to notify the first wireless communication terminal of data, already transmitted to the first wireless communication terminal, from another base station via the second wireless communication terminal, and therefore the data transmission part transmits residual data when the first estimated time is smaller than the second estimated time.

In the base station of the present invention, the data transmission part transmits residual data when a sum of an estimated moving speed of the first wireless communication terminal and an estimated moving speed of the second wireless communication terminal is less than the predetermined threshold.

In the base station of the present invention, the data transmission part calculates the received signal quality after a degradation of signal quality in an interterminal communication based on the signal quality degradation information occurring until completion of transmitting residual data via an interterminal communication, wherein the data transmission part transmits residual data when the received signal quality is equal to or above the predetermined threshold.

In a further aspect of the present invention, a base station includes a wireless communication part which communicates with a wireless communication terminal; a line communication part which communicates with another base station; and a data transmission request part which specifies an identification of the wireless communication terminal, undergoing a communication failure with another base station, with respect to another base station, thus transmitting data to be transmitted to the wireless communication terminal.

The present invention is directed to a wireless communication method implemented using a base station which communicates with another base station; an interterminal communication part which carries out an interterminal communication with another wireless communication terminal; a communication failure detector which detects a communication failure with a first connected base station serving as a base station connected thereto; and a communication resume processor which carries out an interterminal communication with another wireless communication terminal so as to communicate with a second connected base station, connected to another wireless communication terminal, via another wireless communication terminal when the communication failure detector detects a communication failure with the first connected base station, thus carrying out a process of resuming a communication upon detecting the communication failure.

In a further aspect of the present invention, a wireless communication method is implemented using a base station communication part which communicates with a base station; an interterminal communication part which carries out an interterminal communication with another wireless communication terminal; and an other-identification notification part which notifies a first connected base station of an identification of another wireless communication terminal, which is notified by another wireless communication terminal via an interterminal communication, when a communication failure is detected with the first connected base station serving as a base station connected thereto.

The present invention is directed to a communication method adapted to a base station including a wireless communication part which communicates with a first wireless communication terminal; a line communication part which communicates with another base station; and a data transmission part which transmits data to be transmitted to the first wireless communication terminal to another base station, connected to a second wireless communication terminal carrying out an interterminal communication with the first wireless communication terminal, when a communication failure occurs in the first wireless communication terminal.

In a further aspect of the present invention, a communication method is implemented using a wireless communication part which communicates with a wireless communication terminal; a line communication part which communicates with another base station; and a data transmission request part which specifies an identification of the wireless communication terminal, undergoing a communication failure with another base station, with respect to another base station, thus requesting transmitting data to be transmitted to the wireless communication terminal.

The present invention is directed to a wireless communication program which is executed with a computer to realize a base station communication part implementing a step of communicating with a base station; an interterminal communication part implementing a step of carrying out an interterminal communication with another wireless communication terminal; a communication failure detector implementing a step of detecting a communication failure with a first connected base station serving as a base station connected thereto; and a communication resume processor implementing a step of carrying out an interterminal communication with another wireless communication terminal so as to communicate with a second connected base station, connected to another wireless communication terminal, via another wireless communication terminal when the communication failure detector detects a communication failure with the first connected base station, thus carrying out a process of resuming a communication upon detecting the communication failure.

In a further aspect of the present invention, a wireless communication program is executed with a computer to realize a base station communication part implementing a step of communicating with a base station; an interterminal communication part implementing a step of carrying out an interterminal communication with another wireless communication terminal; and an other-identification notification part implementing a step of notifying a first connected base station of an identification of another wireless communication terminal, which is notified by another wireless communication terminal via an interterminal communication, when a communication failure is detected with the first connected base station serving as a base station connected thereto.

In a further aspect of the present invention, a communication program is executed with a computer to realize a wireless communication part implementing a step of communicating with a first wireless communication terminal; a line communication part implementing a step of communicating with another base station; and a data transmission part implementing a step of transmitting data to be transmitted to the first wireless communication terminal to another base station, connected to a second wireless communication terminal carrying out an interterminal communication with the first wireless communication terminal, when a communication failure occurs in the first wireless communication terminal.

In a further aspect of the present invention, a communication program is executed with a computer to realize a wireless communication part implementing a step of communicating with a wireless communication terminal; a line communication part implementing a step of communicating with another base station; and a data transmission request part implementing a step of specifying an identification of the wireless communication terminal, undergoing a communication failure with another base station, with respect to another base station, thus transmitting data to be transmitted to the wireless communication terminal.

In a further aspect of the present invention, a wireless communication method is realized in such a manner that a first wireless communication terminal carries out an interterminal communication with a second wireless communication terminal so as to communicate with a second connected base station, serving as a base station connected to the second wireless communication terminal, via the second wireless communication terminal when a communication failure is detected with a first connected base station serving as a base station connected thereto, thus carrying out a process of resuming a communication upon detecting the communication failure; the second wireless communication terminal notifies the second connected base station of an identification of the first wireless communication terminal which is notified by the first wireless communication terminal via an interterminal communication; the second connected base station specifies the identification of the first wireless communication terminal with respect to the first connected base station so as to request transmitting data to the first wireless communication terminal; thereafter, the first connected base station transmits data to be transmitted to the first wireless communication terminal to the second connected base station.

Advantageous Effects of Invention

According to the present invention, it is possible for a wireless communication terminal, which is disconnected in communication with a base station, to efficiently restart communication.

DESCRIPTION OF EMBODIMENTS

Hereinafter, the embodiments of the present invention will be described with reference to the drawings.

As expressions of comparing certain values with thresholds in terms of magnitudes, it may be possible to mutually replace an expression of "equal to or more than a threshold" with an expression of "beyond a threshold". Additionally, it is possible to mutually replace an expression of "equal to or less than a threshold" with an expression of "less than a threshold".

First Embodiment

Figure 1:
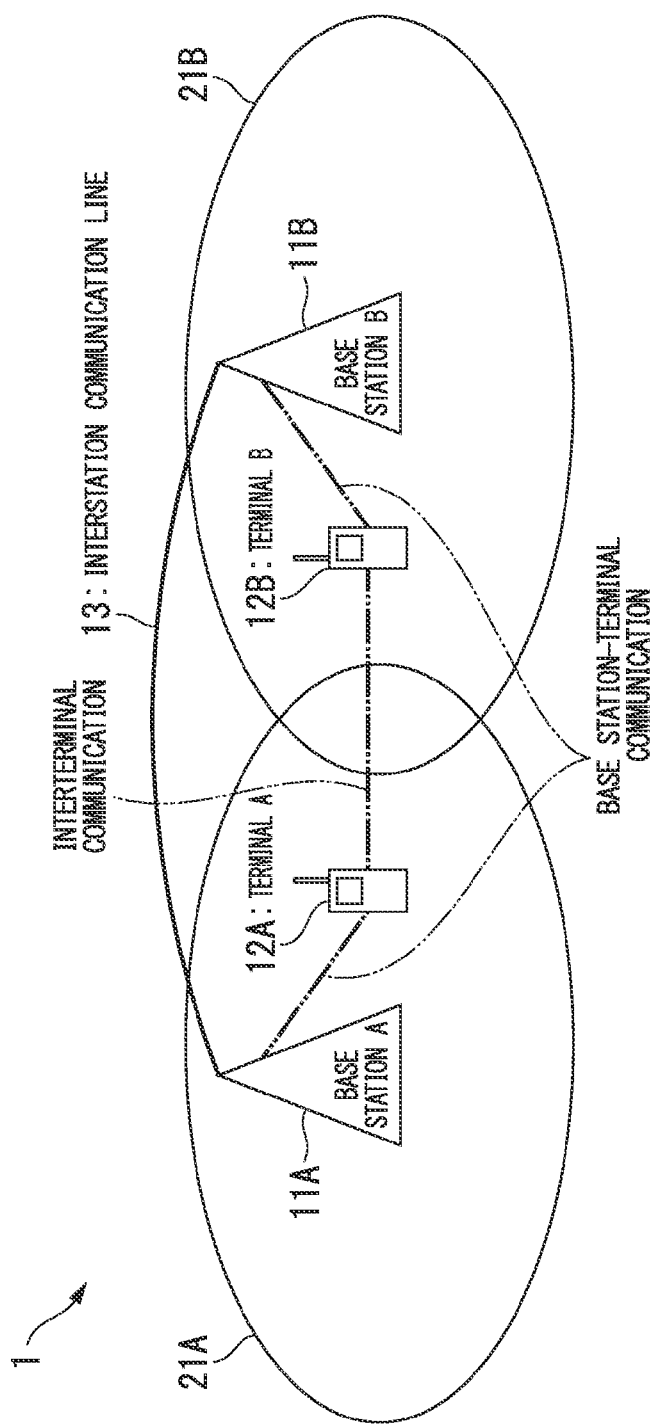
FIG. 1 is a block diagram of a wireless communication system according to one embodiment of the present invention.

FIG. 1 is a block diagram showing an outline configuration of a wireless communication system 1 according to one embodiment of the present invention.

In the present embodiment, the wireless communication system 1 may represent a wireless cellular system intermixed with an interterminal communication.

The wireless communication system 1 of the present embodiment includes a plurality of base stations 11A, 11B (i.e. two in FIG. 1), a plurality of wireless communication terminals 12A, 12B (i.e. two in FIG. 1), and a plurality of lines (interstation lines) 13.

FIG. 1 shows areas 21A, 21B (i.e. communication areas) used to carry out wireless communications with the base stations 21A, 21B.

In the wireless communication system 1, wireless communications (i.e. base station-terminal communications) are carried out between base stations 11A, 11B and wireless communication terminals 12A, 12B disposed in communication areas 21A, 21B of base stations 11A, 11B.

Additionally, communications (i.e. interstation communications) are carried out between one base station and other base stations (i.e. the base stations 11A, 11B in the present embodiment) via an interstation communication line 13. The present embodiment uses a wired line as the interstation communication line 13, but it is possible to use wireless lines in other configurations.

Moreover, wireless communications (i.e. interterminal communications) are carried out between one wireless communication terminal and other wireless communication terminals (i.e. the wireless communication terminals 12A, 12B in the present embodiment).

The present embodiment refers to two base stations included in the wireless communication system 1, but it is possible to include a further number of base stations.

Additionally, the present embodiment refers to two wireless communication terminals included in the wireless communication system 1, but it is possible to include a further number of wireless communication terminals.

Figure 2:
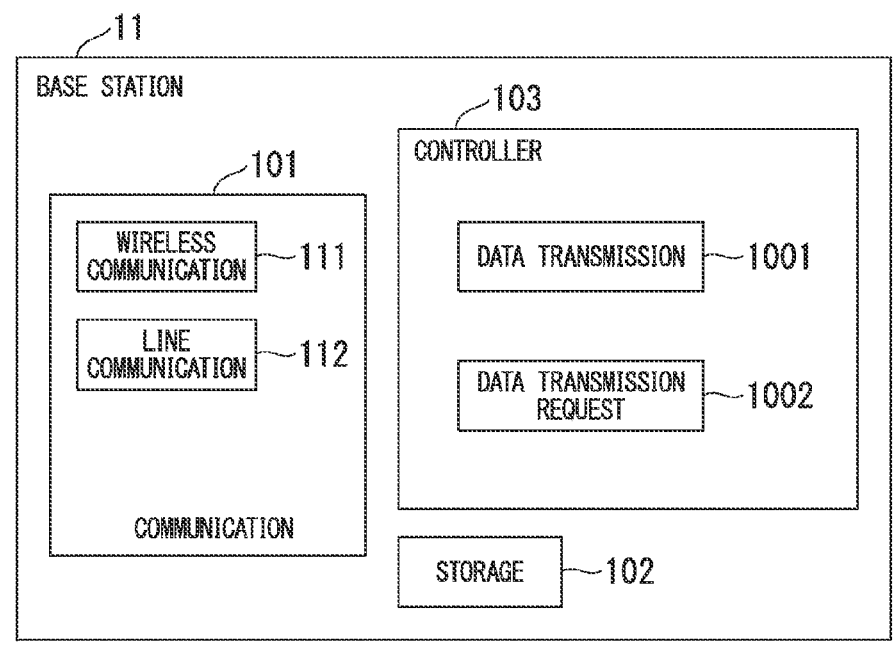
FIG. 2 is a block diagram of a base station according to one embodiment of the present invention.

FIG. 2 is a block diagram showing the outline configuration of the base station 11 according to one embodiment of the present invention.

In the present embodiment, both the base stations 11A and 11B have the same configuration, and therefore they will be collectively referred to as base stations 11.

The base station 11 includes a communication part 101, a storage unit 102, and a controller 103.

The communication part 101 includes a wireless communication part 111 which may wirelessly communicate with the wireless communication terminals 12A, 12B, and a line communication part 112 which may communicate with other base stations via the interstation communication line 13.

The storage unit 102 stores various information (or data) and programs executed with the controller 103. Specifically, the storage unit 102 stores untransmitted data (or residual data) destined to the wireless communication terminals 12A, 12B, and identifications representing the wireless communication terminals 12A, 12B serving as communicating entities being managed by the base station 11.

The controller 103 carries out various processes and controls in the base station 11.

The controller 103 includes a data transmission part 1001 and a data transmission request part 1002.

The data transmission part 1001 executes a process for transmitting data to other base stations.

The data transmission request part 1002 executes a process for requesting transmitting data to other base stations.

Figure 3:
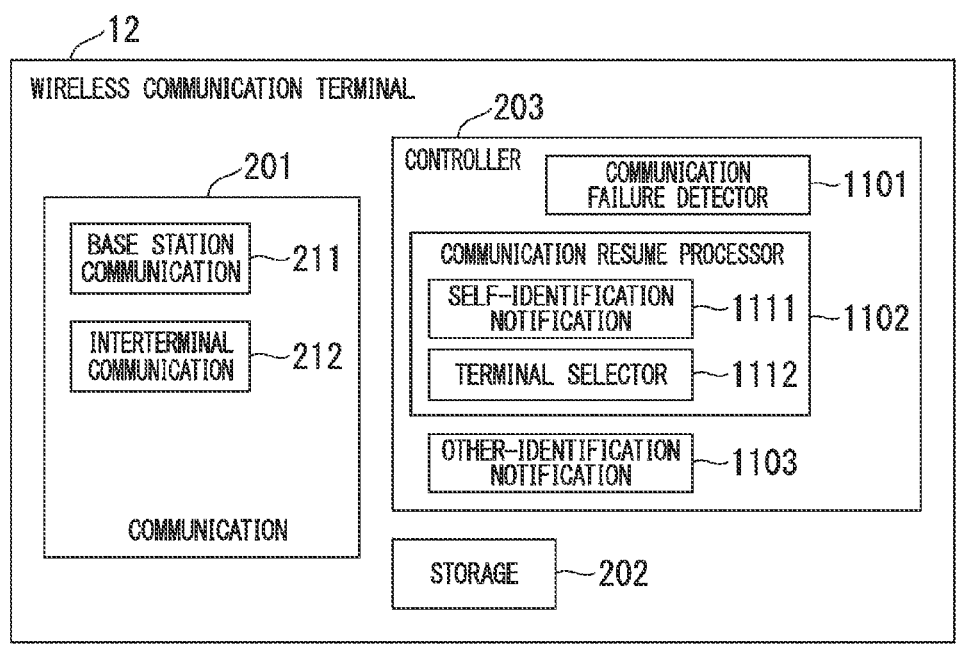
FIG. 3 is a block diagram of a wireless communication terminal according to one embodiment of the present invention.

FIG. 3 is a block diagram showing the outline configuration of the wireless communication terminal 12 according to one embodiment of the present invention.

In the present embodiment, both the wireless communication terminals 12A and 12B have the same configuration, and therefore they will be collectively referred to as the wireless communication terminals 12.

The wireless communication terminal 12 includes a communication part 201, a storage unit 202, and a controller 203.

The communication part 201 includes a base station communication part 211 which may wirelessly communicate with base stations (i.e. the base stations 11A, 11B), and an interterminal communication part 212 which may directly communicate with other wireless communication terminals.

The storage unit 202 stores various information (or data) and programs executed with the controller 203. Specifically, the storage unit 202 stores identifications representing the wireless communication terminals 12.

The controller 203 carries out various processes and controls in the wireless communication terminal 12.

The controller 203 includes a communication failure detector 1101, a communication resume processor 1102, and other-identification notification part 1103.

The communication failure detector 1101 carries out a process for detecting a communication failure with base stations.

The communication resume processor 1102 executes a process for resuming a communication due to occurrence of a communication failure with base stations.

The other-identification notification part 1103 executes a process for notifying identifications of other wireless communication terminals to base stations.

The communication resume processor 1102 includes a self-identification notification part 1111 and a terminal selector 1112.

The self-identification notification part 1111 executes a process for notifying a self-identification (of the wireless communication terminal 12).

The terminal selector 1112 executes a process for selecting other wireless communication terminals performing interterminal communications.

Figure 4:
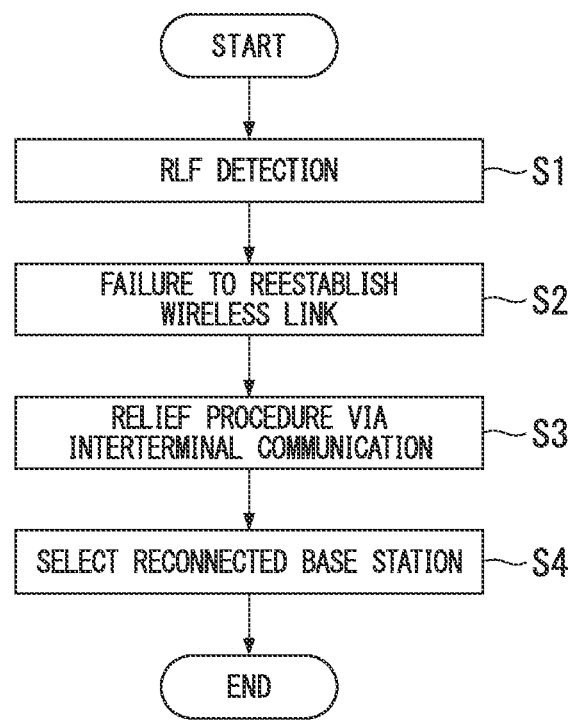
FIG. 4 is a flowchart showing an example of a procedure performed with a wireless communication terminal according to one embodiment of the present invention upon detecting a radio link failure.

FIG. 4 is a flowchart showing an example of a procedure which the wireless communication terminal 12 of the present embodiment performs upon detecting a wireless link failure.

In this connection, both the wireless communication terminals 12A and 12B carry out similar operations serving as the outline process shown in FIG. 4, and therefore the present embodiment collectively refers to those operations with the wireless communication terminal 12.

First, the wireless communication terminal 12 undergoing a communication failure may detect RLF (step S1).

Upon detecting RLF, the wireless communication terminal 12 starts a procedure of reestablishing a wireless link (RRC: Reconfiguration Procedure). Upon successfully completing the reestablishment procedure, the wireless communication terminal 12 resumes communicating with connected stations.

Due to a failure of the reestablishment procedure (step S2), the wireless communication terminal 12 executes a relief procedure using interterminal communications (step S3).

Thereafter, the wireless communication terminal 12 starts to perform a process of selecting a reconnected base station (i.e. Cell Reselection) (step S4).

In the present embodiment described above, the wireless communication terminal 12 executes a relief procedure (i.e. the process of step S3), relating to wireless communication terminals and base stations, at the timing after the wireless communication terminal 12 detects a failure to reestablish a wireless link and before the wireless communication terminal 12 selects a reconnected base station.

Next, the relief procedure using interterminal communications (i.e. the process of step S3) will be described in detail.

For the sake of convenience, the base stations 11A, 11B will be referred to as base stations A, B; the wireless communication terminals 12A, 12B will be referred to as terminals A, B: and the communication areas 21A, 21B will be referred to as communication areas A, B.

In the initial state, it is assumed that the terminal A is connected to the base station A, in other words, the base station A serves as a connected station of the terminal A.

Additionally, the terminal B may be occasionally connected to the base station A or the base station B, in other words, the base station A or B may serve as a connected station of the terminal B.

Hereinafter, a base station connected to a wireless communication terminal will be referred to as a connected base station. Similarly, a base station serving as a connected station of a wireless communication terminal will be referred to as a connected base station.

Figure 5:
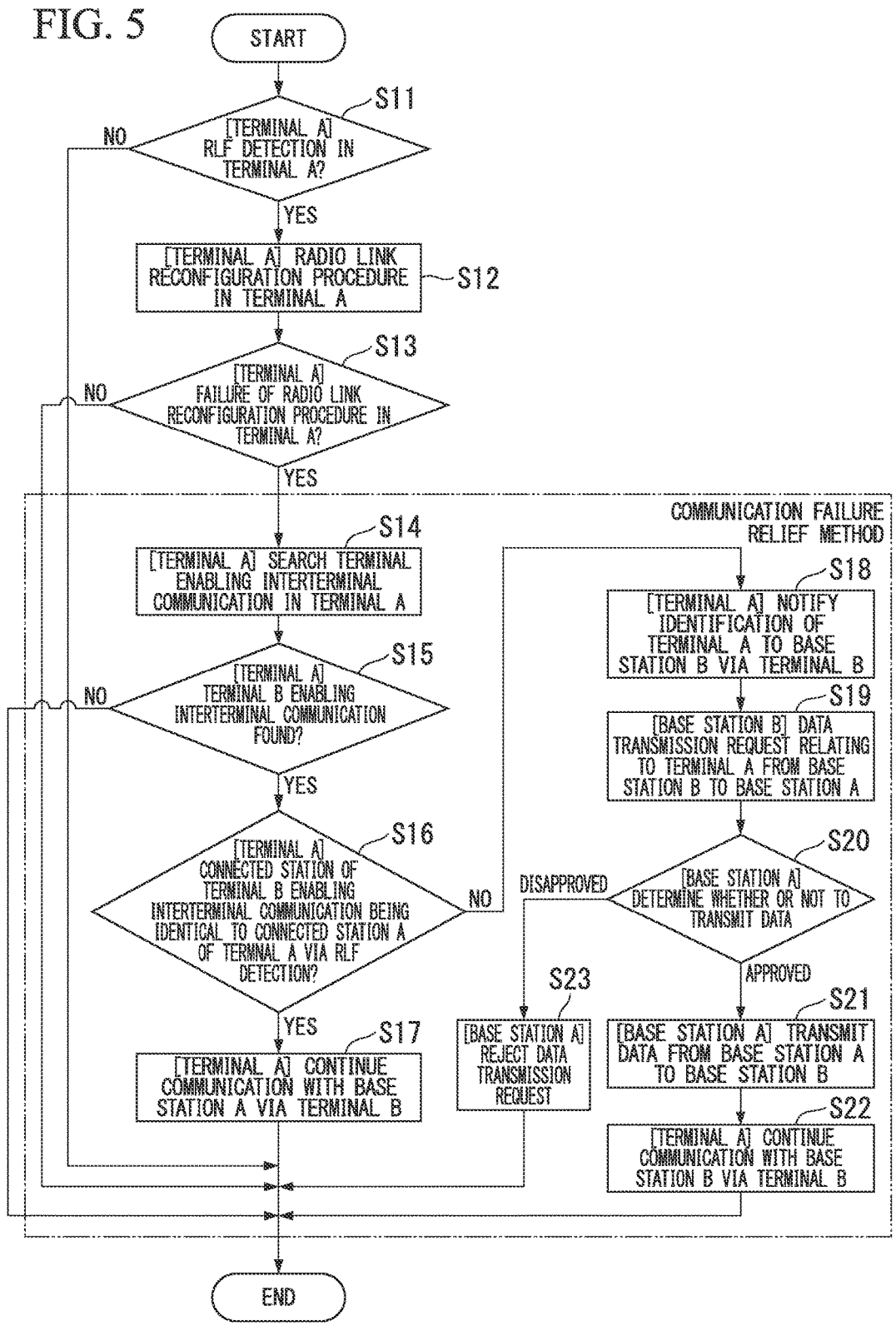
FIG. 5 is a flowchart showing an example of a relief procedure via an interterminal communication according to one embodiment of the present invention.

FIG. 5 is a flowchart showing an example of a detailed relief procedure using interterminal communications according to the present embodiment.

[Process 1] (i.e. a Series of Steps S11 to S13)

It is possible to employ the relief procedure using interterminal communications according to the present embodiment when the wireless communication terminals 12A, 12B detecting RLF fails to reestablish wireless links.

The following description refers to the case where the terminal A detecting RLF (step S11) performs a wireless link reestablishment process (step S12) but fails to reestablish a wireless link (step S13). In this case, it is necessary to implement a method of relieving a terminal undergoing a communication failure (i.e. a method of steps S14 to S22). Herein, it is necessary to perform [Process 2] at first.

It is possible to exit the process when both the wireless communication terminals 12A, 12B fail to detect RLF or when they do not fail to reestablish wireless links.

[Process 2] (i.e. a Series of Steps S14 to S16)

The terminal A which fails to reestablish a wireless link determines (or searches) the presence or absence of other terminals enabling interterminal communications with the terminal A (step S14). Based on the search result, the terminal A determines the presence or absence of other terminals enabling interterminal communications with the terminal A (step S15).

The following description refers to the case where the terminal A detects the terminal B serving as another terminal enabling interterminal communications with the terminal A.

It is possible to exit the process when the terminal A fails to detect another terminal enabling interterminal communications with the terminal A.

When the terminal A detects the terminal B serving as another terminal enabling interterminal communications with the terminal A, the terminal A performs an interterminal communication with the terminal B so as to acquire the information representing the connected station of the terminal B.

The connected station information includes the identifications of the base stations A, B (i.e. the connected base stations) connected to the terminals A, B respectively.

In general, there is a possibility that a plurality of other terminals can perform interterminal communications with the terminal A.

In this case, the terminal A selects one of other terminals by use of either (terminal selecting method a) or (terminal selecting method b) as follows.

The above (terminal selecting method a) selects a terminal having the highest signal quality (e.g. the highest received signal quality).

The above (terminal selecting method b) selects a terminal having the same connected station (or the same connected base station) as the terminal A, if it exists, among terminals each having the received signal quality equal to or above the predetermined threshold (e.g. a certain threshold which is determined in advance), or a terminal having the highest received signal quality if any terminals having the same connected station (or the connected base station) as the terminal A cannot be found.

In the above (terminal selecting method a) and (terminal selecting method b), for example, it is possible to employ the received signal quality representing the quality of received signals from other terminals enabling interterminal communications with the terminal A.

In this connection, it is possible to employ the signal quality using an arbitrary index.

The following description refers to the case where the terminal A detects the terminal B alone as another terminal enabling interterminal communications with the terminal A or where the terminal A detects a plurality of terminals as other terminals enabling interterminal communications with the terminal A so as to select the terminal B from among those terminals.

The terminal A determines whether or not the connected station (or the connected base station) of the terminal B, serving as another terminal enabling interterminal communications with the terminal A, is identical to the connected station (or the connected base station) of the terminal A detecting RLF (step S16).

Based on the determination result, when the terminal A determines that the connected station (or the connected base station) of the terminal B matches the connected station (or the connected base station) of the terminal A, it carries out [Process 3]. In contrast, when the terminal A determines that the connected station of the terminal B does not match (or differs from) the connected station (or the connected base station) of the terminal A, it carries out [Process 4].

In this connection, it is possible to exit the process when the terminal A fails to detect other terminals enabling interterminal communications with the terminal A.

As the method of detecting peripheral terminals, for example, it is possible to employ the method disclosed in Non-Patent Literature Document 3 (see Non-Patent Literature Document 3).

As the method of exchanging information between two terminals which differ from each other (i.e. the method of exchanging information between the terminals A and B in the present embodiment), for example, it is possible to employ the method disclosed in Non-Patent Literature Document 3, thus achieving interterminal communications (see Non-Patent Literature Document 3).

[Process 3] (i.e. the Process of Step S17)

Based on the determination result of step S16, when the terminal A determines that the connected station (or the connected base station) of the terminal B matches the connected station (or the connected base station) of the terminal A, the terminal A continues to communicate with the connected station (i.e. the base station A) via the terminal B (step S17). Thus, it is possible to exit the process.

In this case, residual data (or untransmitted data) of the base station A destined to the terminal A will be transmitted from the base station A to the terminal A via the terminal B by way of interterminal communications between the terminals A and B. Specifically, data is wirelessly transmitted from the base station A to the terminal B, and then the data is transmitted from the terminal B to the terminal A via interterminal communications.

[Process 4] (i.e. a Series of Steps S18 to S23)

The following description refers to the case where the terminal A determines that the connected station (or the connected base station) of the terminal B does not match (or differs from) the connected station (or the connected base station) of the terminal A based on the determination result of step S16. Herein, it is assumed that the base station A serves as the connected station of the terminal A while the base station B serves as the connected station of the terminal B.

In this case, the terminal A transmits and notifies the self-identification (of the terminal A) to the base station B via the terminal B by way of interterminal communications with the terminal B (step S18). Specifically, the identification is transmitted from the terminal A to the terminal B, and then the identification is transmitted from the terminal B to the base station B.

The identification of the terminal A includes the information identifying the terminal A. The identification of the terminal A is stored in and managed by the connected station of the terminal A (i.e. the base station A). Based on the identification of the terminal A, the other base station B may detect that the base station A serves as the connected station of the terminal A.

Upon receiving the identification of the terminal A, the base station B transmits to the connected station of the terminal A (i.e. the base station A) a signal (i.e. a data transmission request signal) to request transmitting data regarding the terminal A thereto (i.e. the base station B) (step S19).

As the data regarding the terminal A in the base station A, it is possible to use residual data (or untransmitted data) of the base station A destined to the terminal A.

The base station A determines whether or not to transmit data as requested by the base station B (step S20).

Based on the determination result, when the base station A determines to transmit data as requested by the base station B, it transmits the requested data to the base station B (step S21).

In this case, the terminal A starts and continues to communicate with the connected station of the terminal B (i.e. the base station B) via the terminal B by way of interterminal communications with the terminal B (step S22). Thus, it is possible to exit the process.

In this case, residual data (or untransmitted data) of the base station A is transmitted from the base station A to the base station B and then to the terminal A via the terminal B by way of interterminal communications between the terminals A and B. Specifically, the data is transmitted from the base station A to the base station B via interstation communications; the data is wirelessly transmitted from the base station B to the terminal B; then the data is transmitted from the terminal B to the terminal A via interterminal communications.

Based on the determination result of step S20, when the base station A determines not to transmit data as requested by the base station B, the base station A rejects a data transmission request owing to a data transmission request signal being received from the base station B (step S23). Thus, it is possible to exit the process.

A series of steps S18 to S23 will be described in further details with reference to (Concrete Process 1 of [Process 4]) through (Concrete Process 6 of [Process 4]).

(Concrete Process 1 of [Process 4])

The terminal A notifies the terminal B of the identification of the terminal A in the connected station of the terminal A (i.e. the base station A) (i.e. part of step S18).

As the terminal identification based on the LTE standard, for example, the terminal A notifies the UE context information (of the terminal A). The UE context information includes the information used to identify the connected terminal of a base station (see Non-Patent Literature Document 4).

For example, the base station notifies the terminal of the UE context information in accordance with (notification procedure 1 of UE context information) through (notification procedure 2 of UE context information) as follows.

(Notification Procedure 1 of UE Context Information)

When the terminal A predicts a reduction of communication quality, the terminal A may transmit the UE context notification request (or a UE context request) to the connected station of the terminal A (i.e. the base station A).

It is possible to determine communication quality, or a reduction of communication quality, depending on at least one or two (both) of conditions described in (example 1 of communication quality) and (example 2 of communication quality).

In the above (example 1 of communication quality), it is possible to assume a reduction of communication quality in the state in which the measured value of RSRQ (Reference Signal Received Quality) applied to the connected station of the terminal A (i.e. the base station A) becomes equal to or lower than the predetermined threshold (e.g. a certain threshold which is determined in advance) and when the state is sustained for the predetermined time (e.g. a certain time which is determined in advance). In this case, it is possible to use the RSRQ value as the value representing the communication quality.

In the above (example 2 of communication quality), it is possible to assume a reduction of communication quality in the state in which the communication rate of the terminal A becomes less than the predetermined threshold (e.g. a certain threshold which is determined in advance) and when the state is sustained for the predetermined time (e.g. a certain time which is determined in advance). In this case, it is possible to use the communication rate as the value representing the communication quality.

(Notification Procedure 2 of UE Context Information)

Upon receiving a UE context notification request, the connected station of the terminal A (i.e. the connected base station A) notifies the terminal A of the UE context information (i.e. a UE context report).

Even when the connected station of the terminal A (i.e. the base station A) fails to receive a UE context notification request, it notifies a UE context notification starting message to the terminal A which may satisfy the predetermined condition (e.g. predetermined one or more conditions) among (notification condition 1 of UE context information) through (notification condition 3 of UE context information), thus notifying the terminal A of the UE context information.

No conditions are described in (notification condition 1 of UE context information). In this case, the connected station (or the connected base station) A of the terminal A normally notifies the terminal A of the latest UE context information.

In the above (notification condition 2 of UE context information), the connected station of the terminal A (i.e. the base station A) notifies the terminal A of the UE context information when the received signal quality, which is determined based on CQI (Channel Quality Indicator) of the terminal A, becomes equal to or lower than the predetermined threshold (e.g. a certain threshold which is determined in advance) for the predetermined time (e.g. a certain time which is determined in advance).

In the above (notification condition 3 of UE context information), the connected station of the terminal A (i.e. the base station A) notifies the terminal A of the UE context information when an RSRQ value or an RSRP value regarding the connected station (i.e. the connected base station A), included in Measurement Report which the terminal A has recently notified for the predetermined time (e.g. a certain time which is determined in advance), becomes less than the predetermined threshold (e.g. a certain threshold which is determined in advance).

(Concrete Process 2 of [Procedure 4])

The terminal B notifies the identification (or the terminal identification information) of the terminal A to the connected station of the terminal B (i.e. the base station B) (part of step S18).

(Concrete Process 3 of [Procedure 4])

The connected station of the terminal B (i.e. the base station B) notifies the identification of the terminal A to the connected station of the terminal A (i.e. the base station A) while notifying a request of transmitting residual data of the connected station (i.e. the base station A) destined to the terminal A (step S19).

(Concrete Process 4 of [Procedure 4])

The connected station of the terminal A (i.e. the base station A) may determine whether or not to transmit residual data, destined to the terminal A, to the connected station of the terminal B (i.e. the base station B) based on an arbitrary combination of one or more conditions among (example 1 of criterion) through (example 5 of criterion) (step S20).

It is necessary to implement (concrete process 5 of [Procedure 4]) when the connected station of the terminal A (i.e. the base station A) determines to transmit data.

It is necessary to implement (concrete process 6 of [Procedure 4]) when the connected station of the terminal A (i.e. the base station A) rejects to transmit data.

Example 1 of Criterion

This example shows a policy in which the amount of data being transmitted via D2D (i.e. device-to-device) should be equal to or less than an allowance (or a threshold).

Specifically, the base station A may transmit the amount of residual data, which is retained in the base station A and destined to the terminal A, less than the predetermined threshold (e.g. a certain threshold determined in advance) (step S21). In contrast, the base station A rejects a data transmission request when the amount of residual data, which is retained in the base station A and destined to the terminal A, is equal to or above the predetermined threshold (e.g. a certain threshold determined in advance) (step S23).

Example 2 of Criterion

This example makes a decision based on which part of a communication fails during a data transmitting process.

Specifically, it is possible to make an assumption using x[bit] representing the amount of residual data, which is retained in the base station A and destined to the terminal A, and y [bit] representing the amount of data already transmitted to the terminal A. the base station A may transmit residual data when a ration $x/(x+y)$ of the amount of residual data to the entire amount of transmitting data is less than the predetermined threshold (e.g. a certain threshold determined in advance)(step S21). In contrast, the base station A rejects a data transmission request when the ratio $x/(x+y)$ is equal to or above the predetermined threshold (e.g. a certain threshold determined in advance)(step S23).

Example 3 of Criterion

This example indicates a policy to move up the communication completion time as early as possible.

Specifically, it is possible to make an assumption using x [bit] representing the amount of residual data, which is retained in the base station A and destined to the terminal A, and y [bit] representing the amount of data already transmitted to the terminal A. Additionally, this example employs an estimated data transmission speed $\alpha$ [kbps] for transmitting data from the base station A to the base station B; an estimated data transmission speed $\beta$ [kbps] for transmitting data from the base station B to the terminal B; and an estimated data transmission speed $\chi$ [kbps] for transmitting data from the terminal B to the terminal A. Additionally, this example employs a processing delay $d_1$ [s] necessary for a start procedure and an exit procedure in transmitting residual data of the base station A to the base station B; a processing delay $d_2$ [s] necessary for a start procedure and an exit procedure in transmitting data from the base station B to the terminal B; and a processing delay $d_3$ [s] necessary for a start procedure and an exit procedure in transmitting data from the terminal B to the terminal A. These parameters are given via an external input (or another arbitrary measure).

By using those parameters, the base station A estimates a time required to complete transmitting data so as to transmit residual data of the base station A to the base station B (step S21). Subsequently, the base station A selectively executes a process having a shorter required time either a process of restarting a failed communication with the terminal A or a process of starting a new communication with the base station B while rejecting data obtained through a failed communication (step S23).

The above selecting measure can be expressed using Equation (1).

That is, the base station A may transmit untransmitted data to the base station B when Equation (1) is established (step S21). In contrast, the base station A discards untransmitted data so as to reject a data transmission request from the base station B when Equation (1) is not established (step S23).

$$(x/\alpha)+d_1<(y/\beta)+(y/\chi)+d_2+d_3 \tag{1}$$

Example 4 of Criterion

This example additionally involves the movement of each terminal.

Specifically, it is possible to make an assumption using $v_1$ [m/s] representing an estimated moving speed of the terminal A and $v_2$ [m/s] representing an estimated moving speed of the terminal B implementing an interterminal communication with the terminal A. These parameters are given via an external input (or another arbitrary measure).

For example, it is possible to employ ground speed as the speed of each terminal.

At this time, processing will be carried out according to arbitrary one condition or an arbitrary combination of two or more conditions among (condition 1 of moving speed) through (condition 4 of moving speed).

In the above (condition 1 of moving speed), the base station A rejects a data transmission request of the base station B regarding untransmitted data (step S23) since it is insufficient to secure an adequate connectable time for an interterminal communication between the terminals A and B when the sum of the estimated moving speed $v_1$ of the terminal A and the estimated moving speed $v_2$ of the terminal B is equal to or above the predetermined threshold (e.g. a certain threshold determined in advance). In other cases, the base station A may transmit untransmitted data to the base station B (step S21).

In the above (condition 2 of moving speed) which allows for further inputting the information regarding the moving directions of the terminals A and B in addition to the estimated moving speeds, the base station A calculates a relative moving speed of the terminal A relative to the terminal B (i.e. a scalar speed with a negative sign representing the direction approaching the terminal B or a positive sign representing the direction moving far from the terminal B). The base station A rejects a data transmission request of the base station B regarding untransmitted data (step S23) when the relative moving speed is equal to or above the predetermined threshold (e.g. a certain threshold determined in advance). In other cases, the base station A may transmit untransmitted data to the base station B (step S21).

In the above (condition 3 of moving speed), the base station A rejects a data transmission request of the base station B regarding untransmitted data (step S23) since it is insufficient to secure an adequate connectable time for an interterminal communication with the terminal A when the estimated moving speed $v_1$ of the terminal A is equal to or above the predetermined threshold (e.g. a certain threshold determined in advance). In other cases, the base station A may transmit untransmitted data to the base station B (step S21).

In the above (condition 4 of moving speed), the base station A rejects a data transmission request of the base station B regarding untransmitted data (step S23) since it is insufficient to secure an adequate connectable time for an interterminal communication with the terminal B when the estimated moving speed $v_2$ of the terminal B is equal to or above the predetermined threshold (e.g. a certain threshold determined in advance). In other cases, the base station A may transmit untransmitted data to the base station B (step S21).

Example 5 of Criterion

This example involves the movement of each terminal so as to consider a degradation of signal quality due to attenuation in distance.

The base station A receives a distance between the terminals A and B (where the terminal B carries out an interterminal communication with the terminal A), an estimated fluctuation $d_{d2d}$ [m/s] for each unit time during communication, and an estimated required time $t_{d2d}$ necessary to transmit untransmitted data via an interterminal communication via an external input.

Using the estimated moving distance ($d_{d2d} \times t_{d2d}$) during an interterminal communication, the base station A calculates a degradation of received power levels due to attenuation in distance while calculating a degradation of signal quality based on a signal reception quality during the current interterminal communication. The base station A may transmit untransmitted data to the base station B when a signal reception quality considering a degradation of signal reception quality is equal to or above the predetermined threshold (e.g. a certain threshold determined in advance) (step S21). In contrast, the base station A rejects a data transmission request when a signal reception quality considering a degradation of signal reception quality is less than the predetermined threshold (e.g. a certain threshold determined in advance) (step S23).

(Concrete Process 5 of [Procedure 4])

When the base station A transmits data to the terminal A (step S21), for example, the connected station of the terminal B (i.e. the base station B) transmits data, which is received from the base station A and destined to the terminal A, to the terminal B wirelessly (i.e. via a cellular communication in the present embodiment). Upon receiving data, the terminal B wirelessly transmits the received data to the terminal A via an interterminal communication (step S22). Thus, the terminal A receives the data.

Thus, it is possible to exit a relief procedure (i.e. this process) via an interterminal communication according to the present embodiment as shown in FIG. 5.

(Concrete Process 6 of [Procedure 4])

When the base station A rejects a data transmission request (step S23), for example, the terminal A starts a new communication via the terminal B without continuing a previous communication before RLF detection, or the terminal A stops an interterminal communication so as to start a reconnected base station selecting (Cell Reselection) process used to search a connectable base station (step S4).

Thus, it is possible to exit a relief procedure (i.e. this process) via an interterminal communication according to the present embodiment as shown in FIG. 5.

In the present embodiment employing the above relief procedure using interterminal communications, for example, it is possible to continue a communication in the terminal A, although the conventional art cannot continue a communication in the terminal A, as long as the other terminal B enabling an interterminal communication with the terminal A exits in the periphery of the terminal A.

In the above relief procedure using interterminal communications, for example, it is possible to employ the conventional technology disclosed in Non-Patent Literature Document 4.

In the flowchart shown in FIG. 5, the communication failure detector 1101 of the terminal A carries out step S11; the communication resume processor 1102 of the terminal A carries out a series of steps S12 to S13; the communication resume processor 1102 of the terminal A (in particular, the terminal selector 1112) carries out a series of step S14 to S16; the communication resume processor 1102 of the terminal A carries out step S17; the communication resume processor 1102 of the terminal A (in particular, the self-identification notification part 1111) and the other-identification notification part 1103 of the terminal B carry out step S18; the data transmission request part 1002 of the base station B carries out step S19; the data transmission part 1001 of the base station A carries out a series of steps S20, S21, and S23; and the communication resume processor 1102 of the terminal A carries out step S22.

Next, FIGS. 6 to 9 show examples of sequences with respect to [Procedure 1] through [Procedure 4] in the above relief procedure using interterminal communications.

Figure 6:
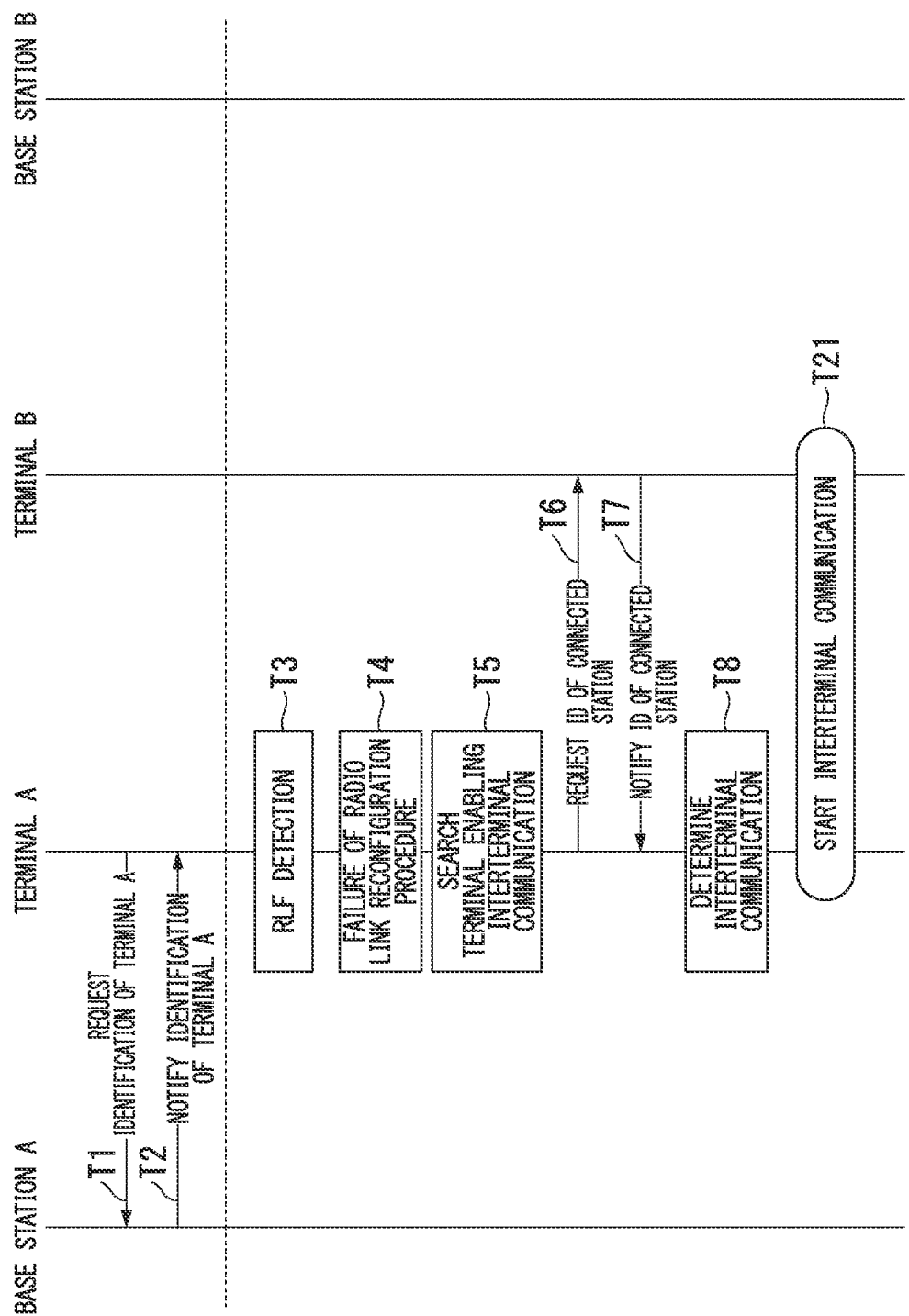
FIG. 6 is a schematic diagram showing an example of a sequence until establishment of an interterminal communication between a terminal A and a terminal B (i.e. procedures 1-2).

FIG. 6 shows an example of a sequence until the establishment of an interterminal communication between the terminals A and B (i.e. Procedures 1-2).

This sequence corresponds to the process before the determination of data forward (or data transmission).

Before detecting RLF, the terminal A may occasionally request the identification of the terminal A (i.e. Process T1). Upon receiving a request, the base station A notifies the terminal A of the identification of the terminal A (i.e. Process T2).

When the terminal A fails in a wireless link reestablishment process (Process T4: steps S12 to S13) upon detecting RLF (Process T3: step S11), the terminal searches other terminals enabling interterminal communications (Process T5: steps S14 to S15). The terminal A requests another terminal (e.g. the terminal B), located in the searched periphery, to provide the identification (i.e. the connected station ID) of the connected station of the terminal B (i.e. the base station B) (Process T6: step S16). In response to a request, the terminal B notifies the terminal A of the identification (i.e. the connected station ID) of the connected station of the terminal B (i.e. the base station B) (Process T7: step S16).

Then, the terminal A determines another terminal (e.g. the terminal B) enabling an interterminal communication (Process T8: step S16) so as to start an interterminal communication (Process T21: step S16).

Figure 7:
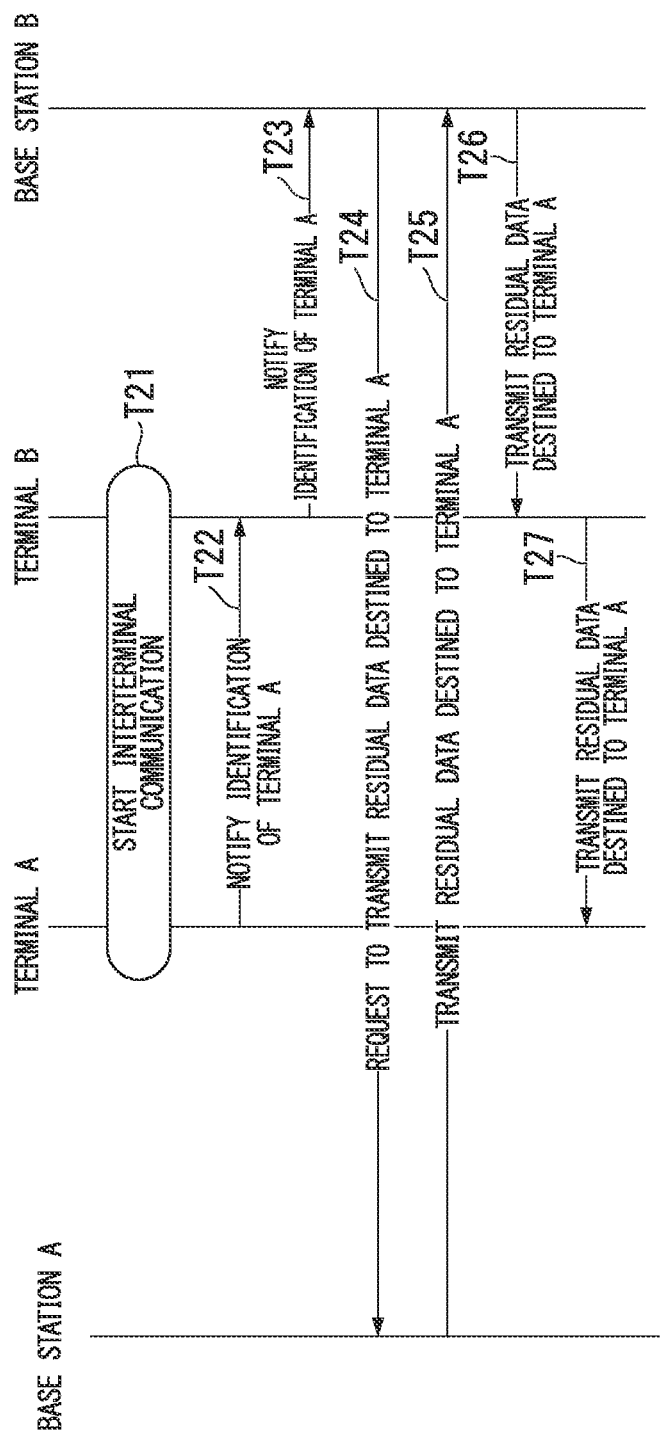
FIG. 7 is a schematic diagram showing an example of a sequence regarding a process of transmitting untransmitted data with a base station A (i.e. procedures 3-4).

FIG. 7 shows an example of a sequence representing the process of transmitting untransmitted data from the base station A (i.e. Procedures 3-4).

This sequence corresponds to the process of executing data forward (or data transmission).

In the interterminal communication (Process T21), the terminal A continues to communicate with the connected station of the terminal A (e.g. the base station A) via the terminal B (step S17) when the connected station (or the base station) of the terminal B serving as the counterpart communicating with the terminal A matches the connected station of the terminal A (e.g. the base station A).

The following description refers to the case where the connected station (or the base station) of the terminal B serving as the counterpart communicating with the terminal A differs from the connected station of the terminal A (e.g. the base station A) in the interterminal communication (Process T21).

The terminal A notifies the terminal B of the identification of the terminal A (Process T22: step S8), and then the terminal B notifies the connected station of the terminal B (e.g. the base station B) of the identification of the terminal A (Process T23: step S18).

The base station B notifies the connected station of the terminal A (i.e. the base station A) of a data transmission request regarding residual data destined to the terminal A (Process T24: step S19). Upon approving the data transmission request, the base station A transmits residual data destined to the terminal A to the base station B (Process T25: steps S20 and S21).

Subsequently, the base station B transmits residual data, which is received from the base station A and destined to the terminal A, to the terminal B (Process T26: step S22), and then the terminal B transmits the received residual data destined to the terminal A to the terminal A via an interterminal communication (Process T27: step S22).

Figure 8:
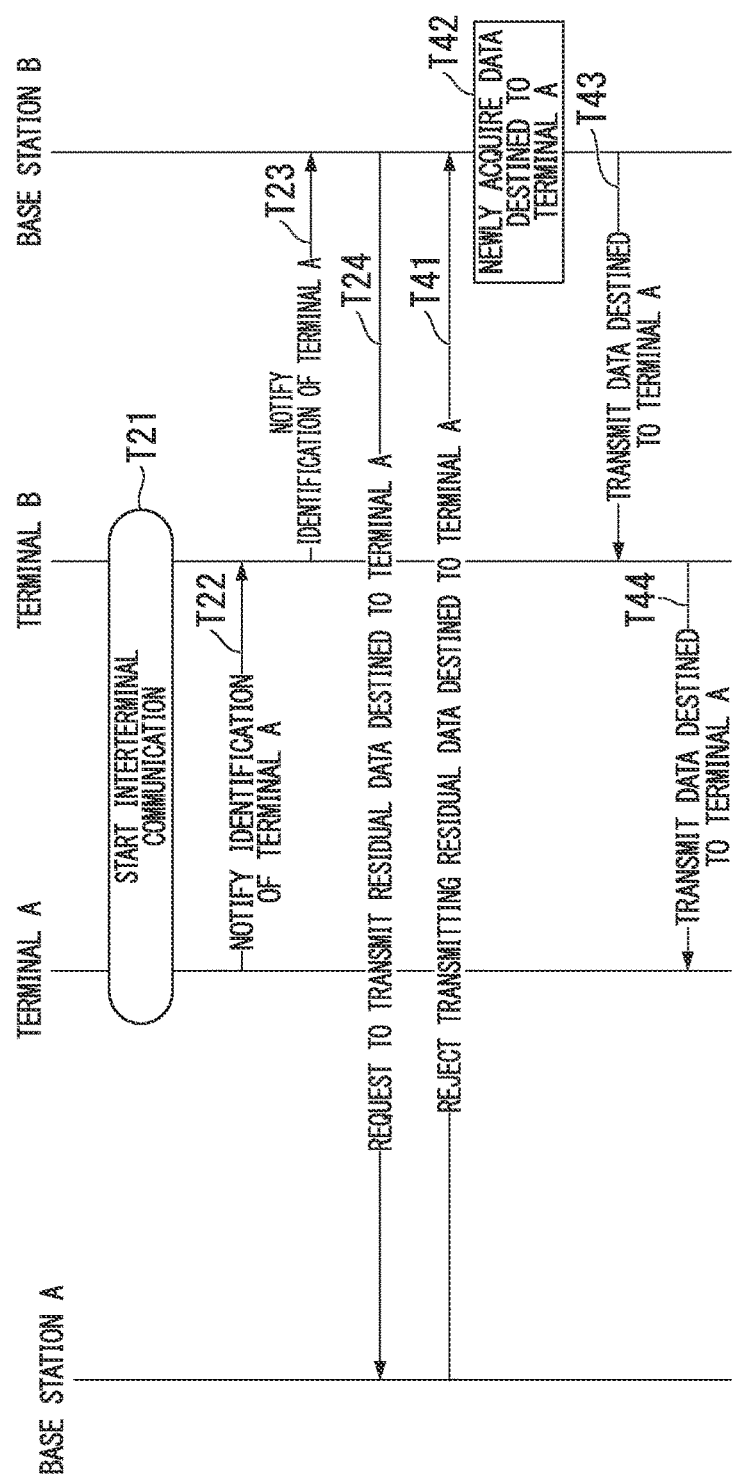
FIG. 8 is a schematic diagram showing an example of a sequence regarding a process of rejecting data transmitted from the base station A and reestablishing an interterminal communication (i.e. procedures 3-4).

FIG. 8 shows an example of a sequence representing the process of rejecting a data transmission request from the base station A and reestablishing a communication using an interterminal communication (i.e. Procedures 3-4).

This sequence corresponds to the process of continuing a communication using an interterminal communication without executing data forward (or data transmission).

Herein, a series of Processes T21 to T24 is described with reference to FIG. 7; hence, subsequent processes will be described below.

To reject a data transmission request from the base station B, the base station A notifies the base station B of a rejection of transmitting residual data destined to the terminal A (Process T41: step S23).

In this case, for example, the base station B newly acquire data destined to the terminal A (Process T42) so as to transmit the acquired data destined to the terminal A to the terminal B (Process T43). Then, the terminal B transmits data, which is received from the base station B and destined to the terminal A, to the terminal A (Process T44).

Figure 9:
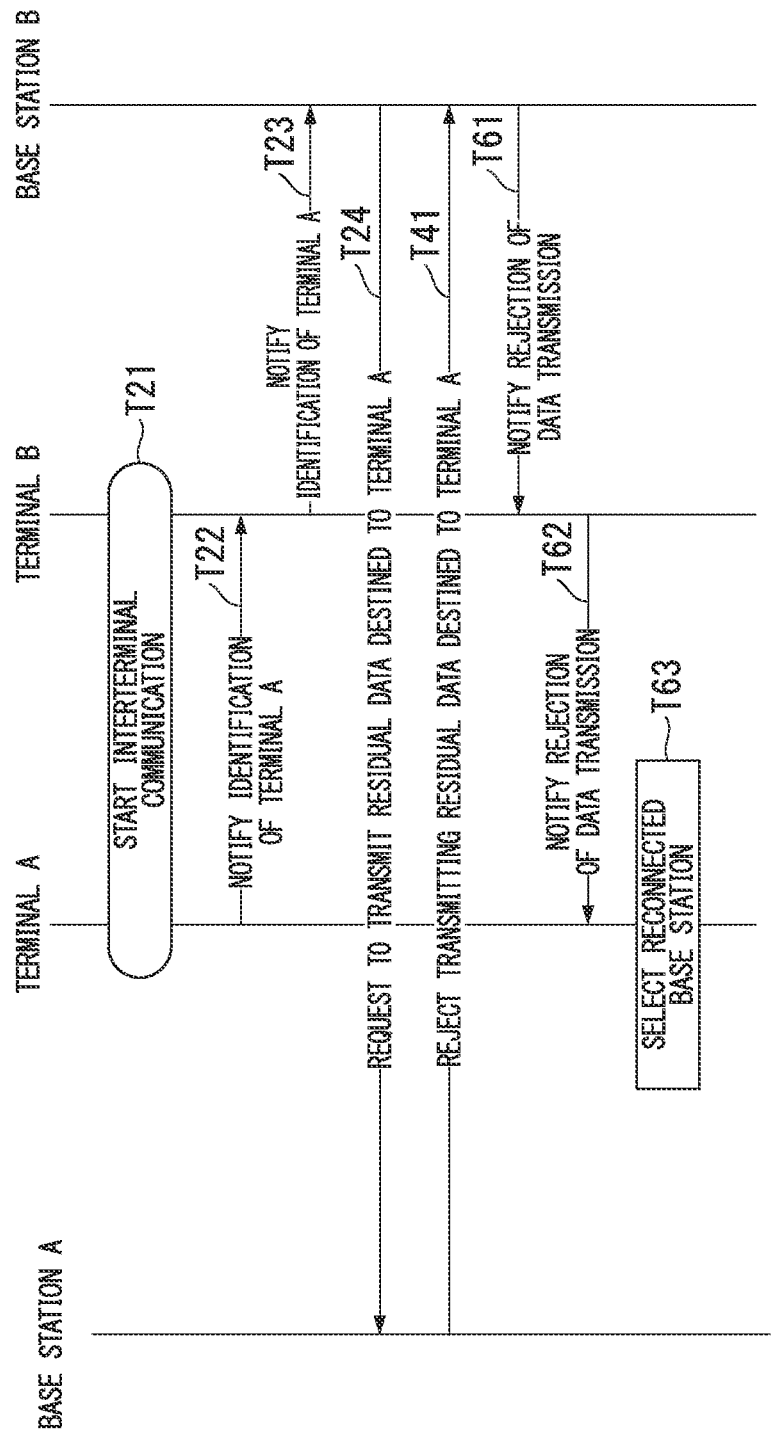
FIG. 9 is a schematic diagram showing an example of a sequence regarding a process of rejecting data transmitted from the base station A and reestablishing cellular communication (i.e. procedures 3-4).

FIG. 9 shows an example of a sequence representing the process of rejecting a data transmission request from the base station A and reestablishing a communication using a cellular communication (i.e. Procedures 3-4).

This sequence corresponds to the process of giving up an interterminal communication without executing data forward (or data transmission) but selecting a reconnected base station (Cell Reselection).

Herein, a series of Processes T21 to T24 is described with reference to FIGS. 7 and 8; hence, subsequent processes will be described below.

The above Process T41 has been described with reference to FIG. 8. To reject a data transmission request from the base station B, the base station A notifies the base station B of a rejection of transmitting residual data destined to the terminal A (Process T41: step S23).

In this case, for example, the base station B notifies the terminal B of a rejection of a data transmission request (Process T61), and then the terminal B notifies the terminal A of a rejection of a data transmission request (Process T62).

Accordingly, the terminal A carries out a process of selecting a reconnected base station (Cell Reselection) (Process T63).

As described above, in the wireless communication system of the present embodiment (i.e. the wireless cellular system of the present embodiment) which allows for coexistence of a communication between a wireless communication terminal and a base station (i.e. a base station-terminal communication) and a communication between a wireless communication terminal and another wireless communication terminal (i.e. an interterminal communication), it is possible to continue a communication between a wireless communication terminal (e.g. the terminal A) and a base station via an interterminal communication so as to minimize an impact of a communication failure even when a communication between a wireless communication terminal (e.g. the terminal A) and a base station is incapacitated (or disconnected). Thus, it is possible for a wireless communication terminal (e.g. the terminal A), which is incapacitated from communicating with a connected station (or a base station), to restart a communication according to a method causing a smaller delay on the condition (or situation) in which another wireless communication terminal (e.g. the terminal B), which is able to communicate with a base station, is located in the periphery (or the surrounding area) of the wireless communication terminal (i.e. the terminal A). Thus, it is possible to relieve a wireless communication terminal (e.g. the terminal A) undergoing a communication failure.

In the wireless communication system of the present embodiment, it is possible to efficiently restart a communication with a wireless communication terminal which fails to communicate with a base station.

In the wireless communication system of the present embodiment, it is possible to carry out data transmission by causing a load of interterminal communications (e.g. wireless communications between the terminals A and B) instead of causing a load of base station-terminal communications (e.g. wireless communications between the base station A and the terminal A), thus achieving a data offload effect.

The wireless communication system of the present embodiment may employ a configuration to restart a failed communication between a wireless communication terminal (e.g. the terminal A) and a connected station of another wireless communication terminal (e.g. the terminal B) via another wireless communication terminal (e.g. the terminal B) enabling an interterminal communication with a wireless communication terminal (e.g. the terminal A) irrespective of a failure of a wireless connection between a wireless communication terminal (e.g. the terminal A) and a base station.

As a concrete configuration, a wireless communication terminal includes a base station communication part 211 which communicates with a base station: an interterminal communication part 212 which carries out an interterminal communication with another wireless communication terminal; a communication failure detector 1101 which detects a communication failure with a base station serving as a connected station; and a communication resume processor 1102 which carries out an interterminal communication with another wireless communication terminal so as to communicate with a base station serving as the connected station of another wireless communication terminal via another wireless communication terminal when the communication failure detector 1101 detects a communication failure with a base station serving as a connected station, thus restarting a communication upon detecting a communication failure.

The wireless communication system of the present embodiment may employ a configuration to transmit untransmitted data, which is destined to a wireless communication terminal (e.g. the terminal A) from a base station via an interterminal communication at the timing after detecting a wireless link failure with the wireless communication terminal (e.g. the terminal A) and before executing a cell reselection process (i.e. a process of selecting a reconnected base station).

As a concrete configuration, a wireless communication terminal includes the communication resume processor 1102 to execute a process of restarting a communication upon detecting a communication failure at the timing before selecting a reconnected base station after the communication failure detector 1101 detects a communication failure with a base station serving as a connected station.

The wireless communication system of the present embodiment may employ a configuration to restart a communication between a wireless communication terminal (e.g. the terminal A) and a connected station (or a base station) via another wireless communication terminal (e.g. the terminal B) enabling interterminal communications on the condition that the connected station (or the base station) of another wireless communication terminal (e.g. the terminal B) enabling interterminal communications matches the connected station (or the base station) of the wireless communication terminal (e.g. the terminal A) undergoing a failure of a wireless connection which occurs between the wireless communication terminal (e.g. the terminal A) and the base station. When a wireless communication terminal (e.g. the terminal A) restarts a failed communication with another wireless communication terminal (e.g. the terminal B) enabling interterminal communications on the condition that the connected station (or the base station) of another wireless communication terminal (e.g. the terminal B) enabling interterminal communications differs from the connected station (or the base station) of the wireless communication terminal (e.g. the terminal A) undergoing a failure of a wireless connection which occurs between the wireless communication terminal (e.g. the terminal A) and the base station, the originally connected station (e.g. the base station A) of the wireless communication terminal (e.g. the terminal A) transmits residual data destined to the wireless communication terminal (e.g. the terminal A) to the connected station (e.g. the base station B) of another wireless communication terminal (e.g. the terminal B) enabling interterminal communications.

As a concrete configuration, a wireless communication terminal includes the communication resume processor 1102 to restart a communication with a base station serving as the connected station thereof (i.e. a base station previously serving as a connected station but undergoing a communication failure) via another wireless communication terminal when the base station serving as the connected station thereof (i.e. a base station previously serving as a connected station but undergoing a communication failure) matches the base station serving as the connected station of another wireless communication terminal enabling interterminal communications. In contrast, it communicates with the base station serving as the connected station of another wireless communication terminal, which receives data destined thereto from the base station serving as the connected station thereof (i.e. a base station previously serving as a connected station but undergoing a communication failure), when the base station serving as the connected station thereof (i.e. a base station previously serving as a connected station but undergoing a communication failure) differs from the base station serving as the connected station of another wireless communication terminal enabling interterminal communications.

The wireless communication system of the present embodiment may employ a configuration to notify from a wireless communication terminal (e.g. the terminal A) to another wireless communication terminal (e.g. the terminal B) enabling interterminal communications the identification of a wireless communication terminal (e.g. the identification of the terminal A) used to identify untransmitted data destined to the wireless communication terminal (e.g. the terminal A) in the connected station (e.g. the base station A) of the wireless communication terminal (e.g. the terminal A) undergoing a failure of a wireless connection.

As a concrete configuration, a wireless communication terminal includes the communication resume processor 1102 further including the self-identification notification part 1111 which notifies another wireless communication terminal enabling interterminal communications of the identification thereof used to identify data being transmitted from a base station serving as the connected station thereof (i.e. a base station previously serving as a connected station but undergoing a communication failure) thereto.

The wireless communication system of the present embodiment may employ a configuration to select a wireless communication terminal having the highest received signal quality, thus implementing a measure to select another wireless communication terminal enabling interterminal communications with a wireless communication terminal (e.g. the terminal A) undergoing a failure of a wireless connection.

As a concrete configuration, a wireless communication terminal includes the communication resume processor further including the terminal selector 1112 which selects a wireless communication terminal having the highest received signal quality, serving as another wireless communication terminal enabling interterminal communications, among wireless communication terminals enabling interterminal communications.

The wireless communication system of the present embodiment may employ a configuration implementing a method of selecting another wireless communication terminal enabling interterminal communications with a wireless communication terminal (e.g. the terminal A) undergoing a failure of a wireless connection, wherein it is necessary to preferentially select another wireless communication terminal, connected to the same station as the connected station of a wireless communication terminal (i.e. the terminal A) undergoing a failure of a wireless connection, among other wireless communication terminals each having the received signal quality equal to or above the predetermined threshold (e.g. a certain threshold determined in advance).

As a concrete configuration, the wireless communication terminal includes the communication resume processor 1102 further including the terminal selector 1112 which preferentially selects another wireless communication terminal, connected to the same base station as the base station serving as the connected station thereof (i.e. a base station previously serving as a connected station but undergoing a communication failure), among other wireless communication terminals enabling interterminal communications with the received signal quality equal to or above the threshold.

The wireless communication system of the present embodiment may employ a configuration in which another wireless communication terminal (e.g. the terminal B) enabling interterminal communications with a wireless communication terminal (e.g. the terminal A) undergoing a failure of a wireless connection notifies the connected station thereof (e.g. the base station B) of the identification of the wireless communication terminal (e.g. the terminal A) undergoing a failure of a wireless connection.

As a concrete configuration, the wireless communication terminal includes the base station communication part 211 which communicates with a base station; the interterminal communication part 212 which carries out interterminal communications with another wireless communication terminal; and the other-identification notification part 1103 which notifies a base station serving as the connected station thereof of the identification of another wireless communication terminal which another wireless communication terminal notifies via interterminal communications when detecting a communication failure with a base station serving as a connected station.

The wireless communication system of the present embodiment may employ a configuration to transmit residual data, which is retained in the originally connected base station (e.g. the base station A) of a wireless communication terminal (e.g. the terminal A) and destined to the wireless communication terminal (e.g. the terminal A) undergoing a failure of a wireless communication, from the originally connected base station (e.g. the base station A) to another base station (e.g. the base station B) resuming the failed communication.

As a concrete configuration, the base station includes a wireless communication part 111 which communicates with a wireless communication terminal; a line communication part 112 which communicates with another base station; and a data transmission part 1001 which transmits data destined to a wireless communication terminal undergoing a communication failure with the base station to another base station serving as the connected station of another wireless communication terminal enabling interterminal communications with the wireless communication terminal undergoing a communication failure with the base station.

The wireless communication system of the present embodiment may employ a configuration to transmit residual data from the originally connected base station (e.g. the base station A) of a wireless communication terminal (e.g. the terminal A) to a base station (e.g. the base station B) resuming a failed communication when the amount of residual data, which is retained in the base station and destined to the wireless communication terminal (e.g. the terminal A) undergoing a failure of a wireless connection, is less than the predetermined threshold (e.g. a certain threshold determined in advance).

As a concrete configuration, the base station includes the data transmission part 1001 which transmits data destined to a wireless communication terminal undergoing a communication failure with the base station when the amount of data is less than the predetermined threshold.

The wireless communication system of the present embodiment may employ a configuration which transmits residual data from the originally connected base station (e.g. the base station A) of a wireless communication terminal (e.g. the terminal A) to a base station (e.g. the base station B) resuming a failed communication when a ratio of the amount of residual data, which is retained in the base station and destined to the wireless communication terminal (e.g. the terminal A) undergoing a failure of a wireless communication, to the entire amount of transmitting data is less than the predetermined threshold (e.g. a certain threshold determined in advance).

As a concrete example, the base station includes the data transmission part 1001 which transmits data destined to a wireless communication terminal undergoing a communication failure with the base station when the ratio of the amount of data to the entire amount of transmitting data is less than the predetermined threshold.

The wireless communication system of the present embodiment may employ a configuration which compares an estimated time required to transmit residual data destined to a wireless communication terminal (e.g. the terminal A) undergoing a failure of a wireless connection from the originally connected base station (e.g. the base station A) of the wireless communication terminal (e.g. the terminal A) to another base station (e.g. the base station B) resuming the failed communication with an estimated time required to transmit the already-transmitted data destined to the wireless communication terminal (e.g. the terminal A) from another base station (e.g. the base station B) resuming the failed communication to the wireless communication terminal (e.g. the terminal A) via another wireless communication terminal (e.g. the terminal B) enabling interterminal communications, and therefore the residual data is transmitted from the originally connected base station (e.g. the base station A) of the wireless communication terminal (e.g. the terminal A) to another base station (e.g. the base station B) resuming the failed communication when the former estimated time is lower than the latter estimated time.

As a concrete configuration, the base station includes the data transmission part 1001 which compares an estimated time required to transmit residual data destined to a wireless communication terminal undergoing a communication failure with the base station to another base station with an estimated time required to transmit the already-transmitted data destined to the wireless communication terminal undergoing a communication failure with the base station from another base station to the wireless communication terminal undergoing a communication failure with the base station via another wireless communication terminal, thus transmitting the residual data when the former estimated time is lower than the latter estimated time.

The wireless communication system of the present embodiment may employ a configuration which transmits residual data destined to a wireless communication terminal (e.g. the terminal A) from the originally connected base station (e.g. the base station A) of the wireless communication terminal (e.g. the terminal A) to another base station (e.g. the base station B) resuming the failed communication when the sum of an estimated moving speed of the wireless communication terminal (e.g. the terminal A) undergoing a failure of a wireless connection and an estimated moving speed of another wireless communication terminal (e.g. the terminal B) enabling interterminal communications is less than the predetermined threshold (e.g. a certain threshold determined in advance).

As a concrete configuration, the base station includes the data transmission part 1001 which transmits data when the sum of an estimated moving speed of a wireless communication terminal undergoing a communication failure with the base station and an estimated moving speed of another wireless communication terminal is less than the predetermined threshold.

The wireless communication system of the present embodiment may employ a configuration which transmits residual data (or untransmitted data) destined to a wireless communication terminal (e.g. the terminal A) from the originally connected base station (e.g. the base station A) of the wireless communication terminal (e.g. the terminal A) to another base station (e.g. the base station B) resuming the failed communication when the received signal quality during interterminal communications after a degradation of signal quality is equal to or above the predetermined threshold (e.g. a certain threshold determined in advance) based on the signal quality degradation information (e.g. the signal quality degradation information calculated using an estimated moving distance) during interterminal communications for the completion of transmitting untransmitted data from the originally connected base station (e.g. the base station A) of the wireless communication terminal (e.g. the terminal A) undergoing a failure of a wireless connection.

As a concrete configuration, the base station includes the data transmission part 1001 which transmits data when the received signal quality during interterminal communications after a degradation of signal quality is equal to or above the predetermined threshold based on the signal quality degradation information during interterminal communications for the completion of transmitting data.

The wireless communication system of the present embodiment may employ a configuration in which the connected station (e.g. the base station B) of another wireless communication terminal (e.g. the terminal B) enabling interterminal communications with a wireless communication terminal (e.g. the terminal A) undergoing a failure of a wireless connection specifies the identification of the wireless communication terminal (e.g. the identification of the terminal A) to the connected station (e.g. the base station A) of the wireless communication terminal (e.g. the terminal A) undergoing a failure of a wireless connection so as to request transmitting untransmitted data regarding the specified wireless communication terminal.

As a concrete example, the base station includes the wireless communication part 111 which communicates with a wireless communication terminal; a line communication part 112 which communicates with another base station; and a data transmission request part 1002 which specifies the identification of a wireless communication terminal undergoing a communication failure with another base station so as to request transmitting data to the wireless communication terminal.

Second Embodiment

Hereinafter, different parts from the first embodiment will be described in detail; hence, descriptions regarding the same parts as the first embodiment will be omitted or simplified.

Figure 10:
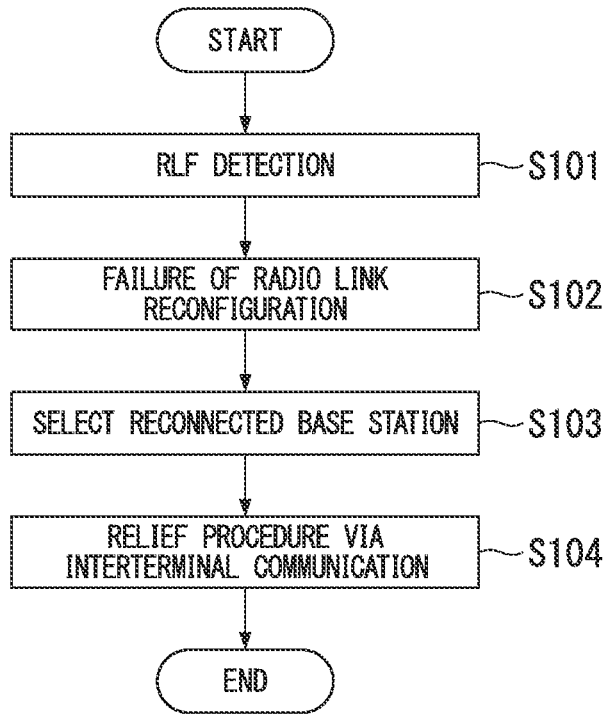
FIG. 10 is a flowchart showing an example of a procedure performed with a wireless communication terminal according to the second embodiment of the present invention upon detecting a radio link failure.
Figure 11:
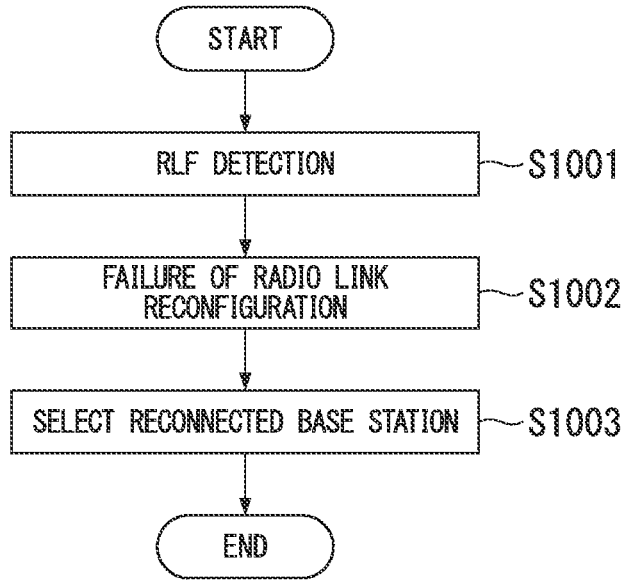
FIG. 11 is a flowchart showing an example of a procedure performed with a wireless communication terminal upon detecting a radio link failure in the LTE system.

In contrast to the first embodiment in which the relief procedure using interterminal communications (i.e. step S3 shown in FIG. 4) is performed before the process of selecting a reconnected base station (i.e. step S4 shown in FIG. 4), the second embodiment is designed such that the relief procedure using interterminal communications (i.e. step S104 shown in FIG. 10) is performed after the process of selecting a reconnected base station (i.e. step S103 shown in FIG. 10). That is, when a wireless communication terminal detecting RLF fails to reestablish a connection with a base station, the first embodiment allows the wireless communication terminal to searches for the presence or absence of another wireless communication terminal enabling interterminal communications while the second embodiment preferentially searches a connectable base station (or a reconnected base station).

FIG. 10 is a flowchart showing an example of a procedure which is performed by the wireless communication terminal 12 of the present embodiment upon detecting a wireless link failure.

In the present embodiment, both the wireless communication terminals 12A and 12B carry out similar operations with respect to the outline processing of FIG. 10; hence, they will be collectively referred to as the wireless communication terminals 12.

The wireless communication terminal 12 undergoing a communication failure may detect RLF at first (step S101).

Upon detecting RLF, the wireless communication terminal 12 starts a radio link reconfiguration procedure (RRC Reconfiguration Procedure). Upon completing the reconfiguration procedure, the wireless communication terminal 12 restarts to communicate with the connected station.

In contrast, when the wireless communication terminal 12 fails in the reconfiguration procedure (step S102), it starts a process of selecting a reconnected base station (Cell Reselection) (step S103).

Thereafter, it is necessary to perform a relief procedure using interterminal communications depending on the result of the reconnected base station selecting process in the wireless communication terminal 12 (step S104).

According to the result of the reconnected base station selecting process in the wireless communication terminal 12, the present embodiment may execute the following processes, i.e. [Procedure 2-1] through [Procedure 2-2], based on the selected base station.

[Procedure 2-1]

When the connected station (i.e. a base station serving as the originally connected station) previously and wirelessly communicating with the wireless communication terminal 12 is selected as a result of the reconnected base station selecting process of the wireless communication terminal 12, the wireless communication terminal 12 restarts to wirelessly communicate with the connected station (i.e. a base station serving as the originally connected station).

When another base station other than the connected station (i.e. a base station serving as the originally connected station) previously and wirelessly communicating with the wireless communication terminal 12 is selected as a result of the reconnected base station selecting process of the wireless communication terminal 12, it is necessary to perform [Procedure 2-2].

[Procedure 2-2]

In [Procedure 2-2], it is necessary to perform similar procedures as [Procedure 2] through [Procedure 4] described in the first embodiment.

According to [Procedure 2-2] applicable to [Procedure 4] of the first embodiment (i.e. concrete process 6 of [Procedure 4]) in which the base station A rejects a data transmission request, for example, the wireless communication terminal 12 does not carry out the reconnected base station selecting process again but starts to wirelessly communicate with the reconnected base station which was already selected.

According to another example regarding [Procedure 2-2] applicable to [Procedure 4] of the first embodiment (i.e. concrete process 4 of [Procedure 4]) in which the base station A rejects a data transmission request, it is possible for the wireless communication terminal 12 to carry out the reconnected base station selecting process (similar to step S103) again.

As described above, the wireless communication system of the present embodiment (i.e. the wireless cellular system of the present embodiment) in which the reconnected base station selecting process is executed before the timing of performing the relief procedure using interterminal communications, wherein it is highly likely that the second embodiment, compared to the first embodiment, may further reduce a communication delay owing to a high probability of each wireless communication terminal selecting the originally connected station (i.e. a base station) as the reconnected base station. Specifically, it is expected that the second embodiment, rather than the first embodiment, may further reduce a communication delay irrespective of severe variations of wireless environments due to high shadowing variations and high moving speeds wireless communication terminals.

The wireless communication system of the present embodiment may employ a configuration to transmit untransmitted data via interterminal communications from a base station to a wireless communication terminal (e.g. the terminal A) just after executing a cell reselecting process upon detecting a radio link failure in the wireless communication terminal (e.g. the terminal A).

As a concrete configuration, the wireless communication terminal includes the base station communication part 211 which communicates with a base station; the interterminal communication part 212 which carries out interterminal communications with another wireless communication terminal; the communication failure detector 1102 which detects a communication failure with a base station serving as a connected station; and the communication resume processor 1102 which carries out interterminal communications with another wireless communication terminal so as to communicate with the base station serving as the connected station of another wireless communication terminal via another wireless communication terminal when the communication failure detector 1101 detects a communication failure with the base station serving as the connected station, thus restarting to communicate with the base station with which a communication failure is detected. After the communication failure detector 1101 detects a communication failure with the base station serving as the connected station, the communication resume processor 1102 restarts to communicate with the base station, with which a communication failure is detected, after selecting the reconnected base station.

For example, the wireless communication system may implement both the function of the first embodiment and the function of the second embodiment, wherein it is possible to adopt and execute the function of the second embodiment (e.g. the procedure shown in FIG. 10) with respect to the relied procedure using interterminal communications with wireless communication terminals when the range of varied intensities of received signals, from each base station, in each wireless communication terminal for each unit time becomes equal to or larger than the predetermined threshold (e.g. a certain threshold determined in advance), while it is possible to adopt and execute the function of the first embodiment (e.g. the procedure shown in FIG. 4) in other cases. According to this configuration, it is possible to use the function of the first embodiment and the function of the second embodiment separately in order to improve an effect of reducing a communication delay.

Summary of the Foregoing Embodiments

Hereinto, the foregoing embodiments of the present invention have been described in detail with reference to the drawings, but concrete configurations are not necessarily limited to those embodiments; hence, it is possible to embrace design changes without departing from the subject matter of the present invention.

It is possible to store programs, implementing functions of devices (e.g. devices such as wireless communication terminals and base stations) according to the foregoing embodiments, in computer-readable storage media; hence, it is possible to load programs, stored in storage media, into computer systems so as to execute them, thus achieving the foregoing functions.

The "computer system" may embrace the operating system (OS) and the hardware such as peripheral devices.

Additionally, the "computer-readable storage media" may refer to flexible disks, magneto-optical disks, ROM (Read-Only Memory), rewritable non-volatile memory such as flash memory, portable media such as DVD (Digital Versatile Disk), and storage units such as hard disks installed in computer systems.

Additionally, the "computer-readable storage media" may refer to any measures capable of retaining programs for a certain time such as volatile memory (e.g. DRAM (Dynamic Random Access Memory)) installed in computer systems serving as servers or clients which may receive programs being transmitted thereto via communication lines, telephone lines, and networks such as the Internet.

The above programs may be transmitted from a computer system with a storage unit storing programs to another computer system via transmission media or via propagation waves in transmission media. Herein, "transmission media" used to transmit programs may refer to any media having functions of transmitting information such as communication lines, telephone lines, and networks (or communication networks) such as the Internet.

The above programs may achieve part of the foregoing functions.

Moreover, it is possible to draft differential files (or differential programs) which are combined with pre-installed programs, which were already stored in a computer system, so as to achieve the foregoing functions.

REFERENCE SIGNS LIST

1 . . . wireless communication system
11, 11A, 11B . . . base station
12, 12A, 12B . . . wireless communication terminal
13 . . . interstation communication line
21A, 21B . . . communication area
101, 201 . . . communication part
102, 202 . . . storage unit
103, 203 . . . controller
111 . . . wireless communication part
112 . . . line communication part
211 . . . base station communication part
212 . . . interterminal communication part
1001 . . . data transmission part
1002 . . . data transmission request part
1101 . . . communication failure detector
1102 . . . communication resume processor
1103 . . . other-identification notification part
1111 . . . self-identification notification part
1112 . . . terminal selector

The invention claimed is:

1. A wireless communication terminal connectible to a base station in association with a secondary base station connectible to a secondary wireless communication terminal, comprising:
a communication part configured to wirelessly communicate with the base station and to wirelessly communicate with the secondary wireless communication terminal by way of an interterminal communication; and
a controller configured to detect a communication failure with the base station connected thereto so as to resume wireless communication through the secondary wireless communication terminal in a different manner according to a first situation and a second situation,
wherein in the first situation where the secondary wireless communication terminal communicates with the base station, the controller notifies an identification used to wirelessly communicate with the base station to the secondary wireless communication terminal via the interterminal communication so as to resume wireless communication using the identification through the secondary wireless communication terminal communicating with the base station, and
wherein in the second situation where the secondary wireless communication terminal communicates with the secondary base station, the controller resumes wireless communication through the secondary wireless communication terminal according to (i) through (iii),
(i) the controller notifies the identification used to wirelessly communicate with the base station to the secondary wireless communication terminal via the interterminal communication so as to notify the identification to the secondary base station through the secondary wireless communication terminal,
(ii) the secondary base station communicates with the base station via an interstation communication so as to retrieve data identified by the identification from the base station, and
(iii) the communication part receives the data from the secondary base station through the secondary wireless communication terminal.

2. The wireless communication terminal according to claim 1, wherein the controller is configured to select the secondary wireless communication terminal having a highest value of received signal quality among a plurality of wireless communication terminals each able to carry out the interterminal communication.

3. The wireless communication terminal according to claim 1, wherein the controller is configured to select the secondary wireless communication terminal having a value of received signal quality equal to or above a predetermined threshold among a plurality of wireless communication terminals each able to carry out the interterminal communication.

4. A wireless communication method adapted to a wireless communication terminal connectible to a base station in association with a secondary base station connectible to a secondary wireless communication terminal, the wireless communication method comprising:
detecting a communication failure occurring between the wireless communication terminal and the base station; and
resuming wireless communication through the secondary wireless communication terminal in a different manner according to a first situation and a second situation,
wherein in the first situation where the secondary wireless communication terminal communicates with the base station, notifying an identification used to wirelessly communicate with the base station to the secondary wireless communication terminal via the interterminal communication so as to resume wireless communication using the identification through the secondary wireless communication terminal communicating with the base station, and
wherein in the second situation where the secondary wireless communication terminal communicates with the secondary base station, executing a series of steps (i) through (iii), (i) notifying the identification used to wirelessly communicate with the base station to the secondary wireless communication terminal via the interterminal communication so as to notify the identification to the secondary base station through the secondary wireless communication terminal, (ii) initiating an interstation communication between the secondary base station and the base station so as to retrieve data identified by the identification from the base station, and (iii) transferring to the wireless communication terminal the data from the secondary base station through the secondary wireless communication terminal.

5. A non-transitory computer-readable storage medium having a stored program causing a computer serving as a wireless communication terminal to implement the wireless communication method according to claim 4.

* * * * *